US009201174B2

(12) United States Patent
Karam et al.

(10) Patent No.: US 9,201,174 B2
(45) Date of Patent: Dec. 1, 2015

(54) LIQUID LENS ARRAYS

(71) Applicants: Raymond Miller Karam, Santa Barbara, CA (US); Georges Roussos, San Jose, CA (US)

(72) Inventors: Raymond Miller Karam, Santa Barbara, CA (US); Georges Roussos, San Jose, CA (US)

(73) Assignee: Invenios Inc, Santa Barbara, CA (US)

( * ) Notice: Subject to any disclaimer, the term of this patent is extended or adjusted under 35 U.S.C. 154(b) by 0 days.

(21) Appl. No.: 14/535,706

(22) Filed: Nov. 7, 2014

(65) Prior Publication Data

US 2015/0070779 A1 Mar. 12, 2015

Related U.S. Application Data

(62) Division of application No. 13/902,766, filed on May 24, 2013, now Pat. No. 8,922,901.

(51) Int. Cl.
| | |
|---|---|
| *G02B 1/06* | (2006.01) |
| *G02B 3/12* | (2006.01) |
| *G02B 26/00* | (2006.01) |
| *G02B 3/00* | (2006.01) |
| *G02B 3/14* | (2006.01) |
| *G02B 13/00* | (2006.01) |

(52) U.S. Cl.
CPC .............. *G02B 3/12* (2013.01); *G02B 3/0012* (2013.01); *G02B 3/0056* (2013.01); *G02B 3/0062* (2013.01); *G02B 3/14* (2013.01); *G02B 13/0075* (2013.01); *G02B 13/0085* (2013.01); *G02B 26/004* (2013.01); *G02B 26/005* (2013.01)

(58) Field of Classification Search
CPC ........ G02B 3/12; G02B 3/14; G02B 13/0075; G02B 13/0085; G02B 26/004; G02B 26/005
USPC .................................................... 359/665, 666
See application file for complete search history.

(56) References Cited

U.S. PATENT DOCUMENTS

2008/0100905 A1* 5/2008 Kato et al. .................... 359/295

\* cited by examiner

*Primary Examiner* — William Choi
(74) *Attorney, Agent, or Firm* — Shalini Venkatesh

(57) ABSTRACT

A method of fabricating a liquid lens array creates an array of through holes of axisymmetric cross-section through a central plate, forms conductive traces on the side walls of each of the through holes and on a portion of the top and bottom surfaces of the central plate contiguous with each through hole, and bonds the bottom surface of the central plate around each through hole to the top surface of a transparent base plate, forming an array of cavities. The method applies an insulating layer to the side walls of each cavity, portions of the top surface of the base plate lying within each cavity, and portions of the top surface of the transparent central plate surrounding each cavity, introduces a polar liquid and a non-polar liquid into each cavity; and bonds the top surface of the central plate to the bottom surface of a transparent top plate.

13 Claims, 6 Drawing Sheets

LIQUID LENS ARRAYS

CROSS REFERENCES TO RELATED APPLICATIONS

This application is a division of the following application, U.S. patent application Ser. No. 13/902,766, entitled "Fabrication of liquid lens arrays", filed on May 24, 2013 which is hereby incorporated by reference, as if set forth in full in this specification.

BACKGROUND

Electrowetting is an interfacial effect in which the contact angle of a polar liquid on a surface may be changed by applying a voltage between the liquid and that surface. The use of liquid lenses, in which the shape of an interface between a polar liquid and a non-polar liquid is controlled by electrowetting to provide optical focusing and optical stabilization functions, has been proposed for cellphones as well as a range of other applications, including barcode readers, surveillance and traffic cameras and medical & military applications, as such lenses are compact in size, robust in design and respond quickly enough to remove hand jitter artifacts. However, the one-at-a-time approach used to date to manufacture liquid lenses has inhibited their widespread implementation in cost-sensitive fields, as it necessarily keeps costs high in relation to more conventional batch-fabricated glass and plastic lenses.

One major problem encountered in manufacturing any liquid lens is the difficulty of making reliable bonds between the component parts in the presence of the liquids involved, one of which typically includes water. Another problem is the liquid expansion that occurs when the fully fabricated liquid lens is raised from room temperature to maximum allowed shipping temperature (e.g. 85° C.) for testing prior to shipping, a standard requirement for consumer products. The liquid expansion can stress those bonds, weakening them up to the point of leakage or failure. An additional problem arises when trying to transition from one-at-a-time to wafer scale assembly of liquid lenses, because fabricating at least one of the essential component parts (a part including substantially conical or other axisymmetrically shaped through holes necessary for liquid confinement) on a wafer scale with the necessary surface profiles and smoothness is difficult and expensive when traditional materials such as aluminum or stainless steel are used for those parts.

It is therefore desirable to provide a method for making arrays of liquid lenses using wafer scale fabrication, employing bonding techniques that work in the presence of liquids, using materials that lend themselves to low-cost but high-precision fabrication, and using designs that accommodate the expected thermal excursions with minimal risk of structural failure. Ideally, the fabrication method would include a simple convenient way to provide the electrical connections required to apply external voltage to manipulate the meniscus and so control the focal length of the lens.

SUMMARY

The present invention includes a method of fabricating an array of liquid lenses. The method comprises first, creating an array of through holes of axisymmetric cross-section through the thickness of a central plate having top and bottom surfaces; second, forming conductive traces on the side walls of each of the through holes in the central plate and on at least a portion of the top and bottom surfaces of the central plate contiguous with each of the through holes. The method continues with bonding at least a portion of the bottom surface of the central plate surrounding each of the through holes to the top surface of a transparent base plate, to form an array of cavities corresponding to the array of through holes; and then applying a layer of an insulating material to coat the side walls of each of the cavities, the portions of the top surface of the base plate lying within each of the cavities, and portions of the top surface of the t central plate surrounding each of the cavities. The method next comprises introducing a polar liquid and a non-polar liquid into each of the cavities; and bonding at least a portion of the top surface of the central plate around each of the cavities to the bottom surface of a transparent top plate, to complete the fabrication of the liquid lens array.

In one aspect, the transparent base plate and the transparent top plate comprise glass. In another aspect, the central plate comprises a photo-structurable glass and creating an array of through holes comprises grinding and polishing the bottom surface of the central plate; laser writing a pattern corresponding to the desired array through the bulk of the central plate; applying a first heat treatment to the transparent central plate; applying an etchant to the transparent central plate; optionally applying UV flood exposure to the central plate; and applying a second heat treatment to the central plate.

DETAILED DESCRIPTION

The manner in which the present invention provides its advantages can be more easily understood with reference to FIGS. 1 through 7.

Figure 1:
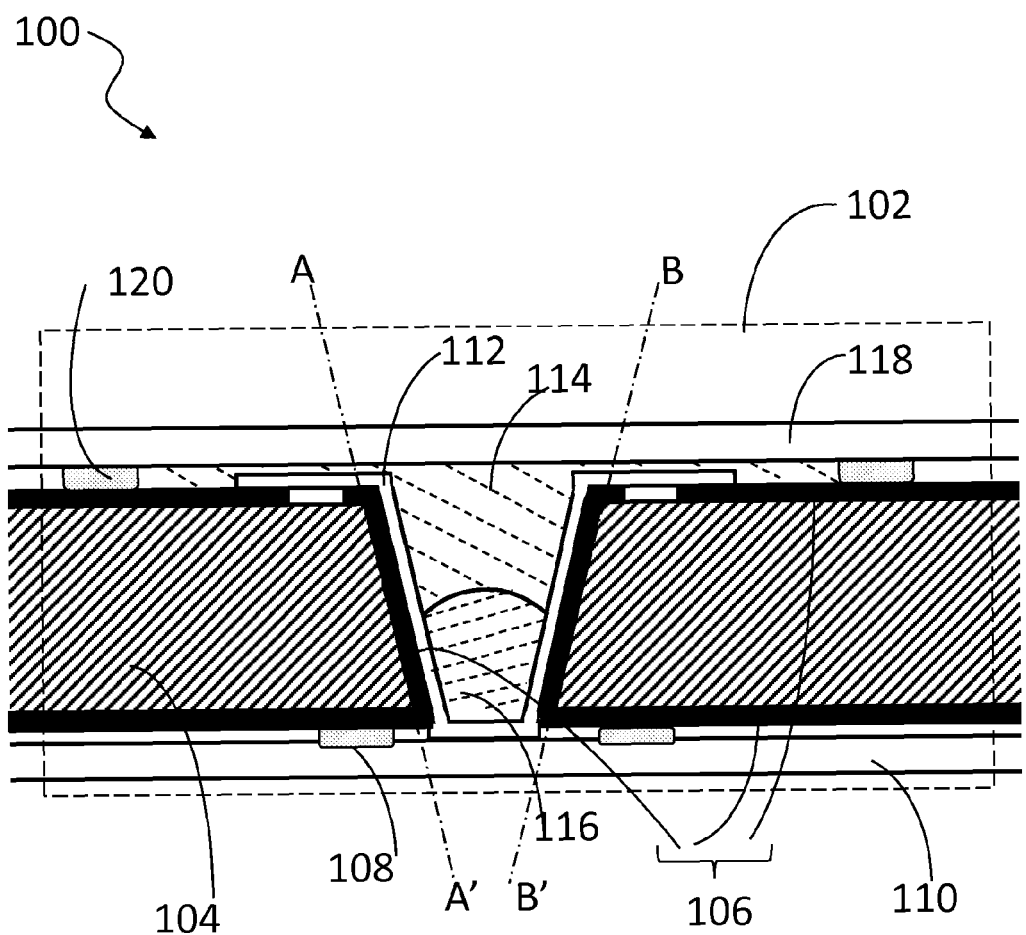
FIG. 1 is a schematic cross-sectional view of part of a liquid lens array according to one embodiment.

FIG. 1 is a schematic cross sectional view of part of a liquid lens array 100 according to one embodiment, including liquid lens 102. At least one identical lens to lens 102 is present (not shown) to one side of lens 102 in the plane of the drawing, or in front of or behind the plane of the drawing. Central plate 104 has a through hole indicated by dashed lines A-A' and B-B' extending through its thickness. Conductive traces 106 lie on the sidewalls of the through hole and on the top and bottom surfaces of the plate 104, including a portion of the top surface contiguous with the through hole. Typical choices for the materials of conductive traces 106 include chromium, gold and/or nickel.

The bottom surface of plate 104 is bonded to the top surface of transparent base plate 110 at a bonding region 108 surrounding the through hole, forming a cavity of axisymmetric cross section. Throughout this disclosure, the term axisymmetric is defined to mean rotationally symmetric about an axis perpendicular to the thickness of the central plate. Simple examples of holes having axisymmetric cross sections include conical and cylindrical holes; other possibilities are flared trumpet shapes, or concave bowl shapes, or combinations of any of these. The critical feature is that the three-dimensional surface of the hole has a shape that could be generated by rotating a line or curve coplanar with an axis though the thickness of the plate through 360° about that axis, so the definition would include holes that transition from one "regular" shape to another—from a cylindrical portion at the bottom of the plate to a conical portion in the mid-section to a flared portion at the top, for example.

A layer of insulating material 112 lies on the side walls of the cavities on top of conductive traces 106, on the portions of the top surface of base plate 198 lying within the cavity, on top of conductive traces 106, and on portions of the top surface of the central plate surrounding the cavity. Polar liquid 114 and non-polar liquid 116 are present within the cavity. Liquids 114 and 116 are chosen to be non-miscible and of different refractive indices, but of similar specific gravity, as required for liquid lens functionality. They may, for example, comprise an aqueous component and an oil component respectively. Top plate 118 is bonded to the top surface of central plate 104 at bonding region 120 around the cavity. Base and top plates 108 and 118 are transparent, at least in their central regions directly overlying the cavity, at the wavelength of intended operation of the liquid lenses.

In some embodiments, base plate 108 and top plate 118 comprise glass. In some embodiments, central plate 104 comprises glass. In some embodiments, central plate 104 comprises a photo-structurable glass. One example of a commercially available photo-structurable glass is Foturan™. In other embodiments, the central plate can be blackened or made out of any of a molded ceramic, a polymer, ceramic, metal matrix or forged or embossed metal, such as aluminum.

In some embodiments, insulating layer 112 comprises a non-conductive polymer. In some embodiments, the non-conductive polymer is Parlylene™. In some embodiments, insulating layer 112 comprises a non-conductive oxide. In some embodiments, each of top plate 118 and bottom plate 108 comprise an antireflection coating.

In applications of liquid lenses directed to focus control, the conductive material of traces 106 may be formed to provide a single electrode over the entire side walls of each cavity and the surrounding portions of the top surface of central plate 104, so the insulating material 112 subsequently deposited lies on top of that electrode and does not make direct contact with the material of the central plate. In applications directed to image stabilization, the conductive material may be patterned after the single electrode is formed, subdividing it to form three or more independently addressable electrodes. In these embodiments, some of the insulating material 112 on the side walls and top surface of central plate 104 lies on top of the conductive material, and some directly contacts the central plate in areas adjacent to the electrodes.

Figure 2:
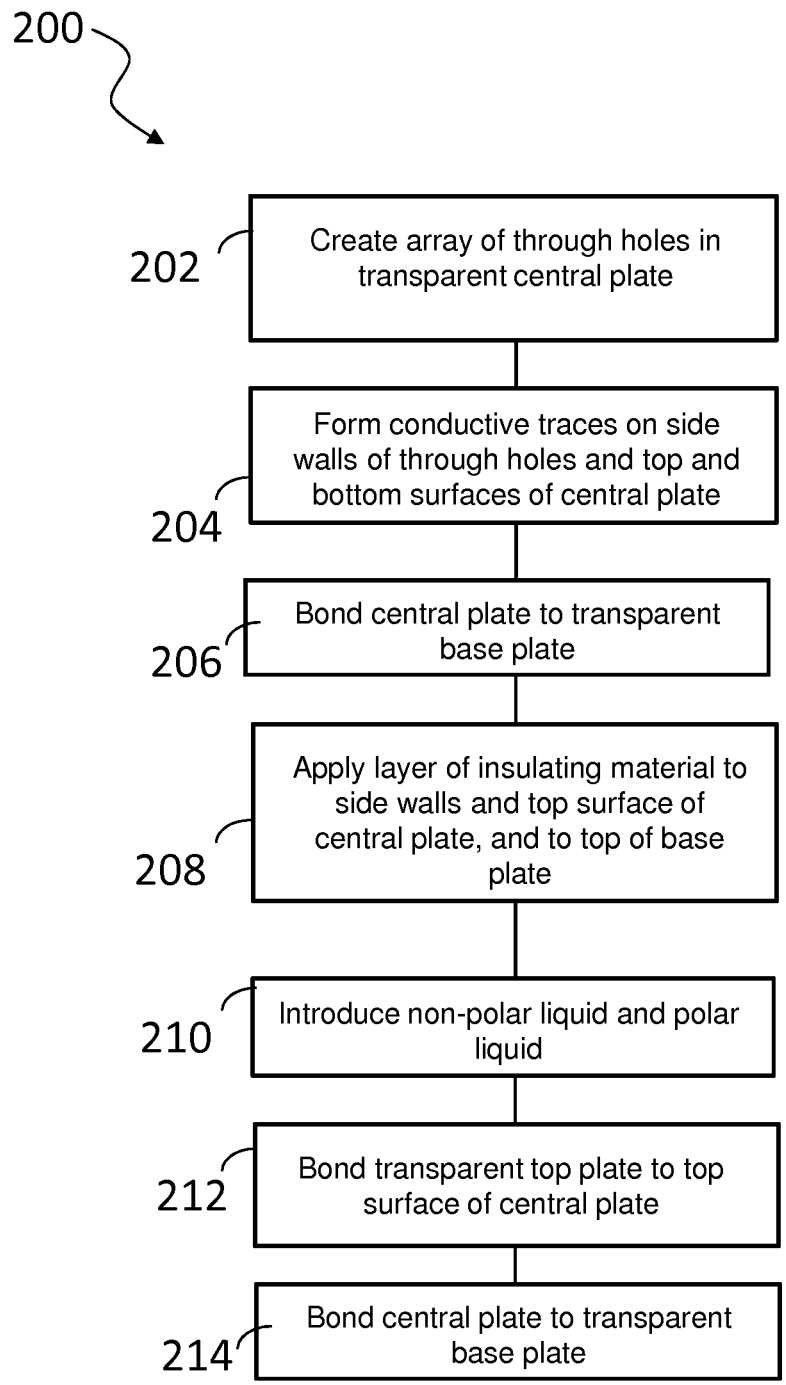
FIG. 2 is a flowchart of process steps for a method of fabricating a liquid lens array according to one embodiment.

FIG. 2 is a flowchart of process steps for a method 200 of fabricating a liquid lens array such as array 100 according to one embodiment. It should be noted that the order of the steps, indicated by first, second etc is significant, indicating that the process step to which the word refers is carried out on an entire array of the elements concerned before the next process step is carried out.

In step 202, an array of through holes of axisymmetric cross-section—substantially conical, for example—is created through the thickness of a central plate. The operation may be performed either sequentially, hole by hole, or in a parallel fashion across the whole plate so that the entire array is created simultaneously. In step 204, conductive traces are formed on the side walls of each of the through holes in the central plate and on at least a portion of the top and bottom surfaces of the central plate contiguous with each of the through holes. In step 206, at least a portion of the bottom surface of the central plate surrounding each of the through holes is bonded to the top surface of a transparent base plate, to form an array of cavities corresponding to the array of through holes.

In step 208 a layer of an insulating material is applied to coat the side walls of each of the cavities, the portions of the top surface of the base plate lying within each of the cavities, and portions of the top surface of the transparent central plate immediately surrounding each of the cavities. In some embodiments, the patterning (or trimming) of this layer may be carried out using a laser. The laser may be part of a nano-second or pico-second pulsed laser scribe scanning system.

In step 210, a polar liquid and a non-polar liquid are introduced into each of the coated cavities. The liquids may be introduced sequentially, in either order, or they may be introduced in combination. In step 212, at least a portion of the top surface of the central plate around each of the liquid-containing cavities is bonded to the bottom surface of a transparent top plate, completing the fabrication of the liquid lens array.

Figure 3:
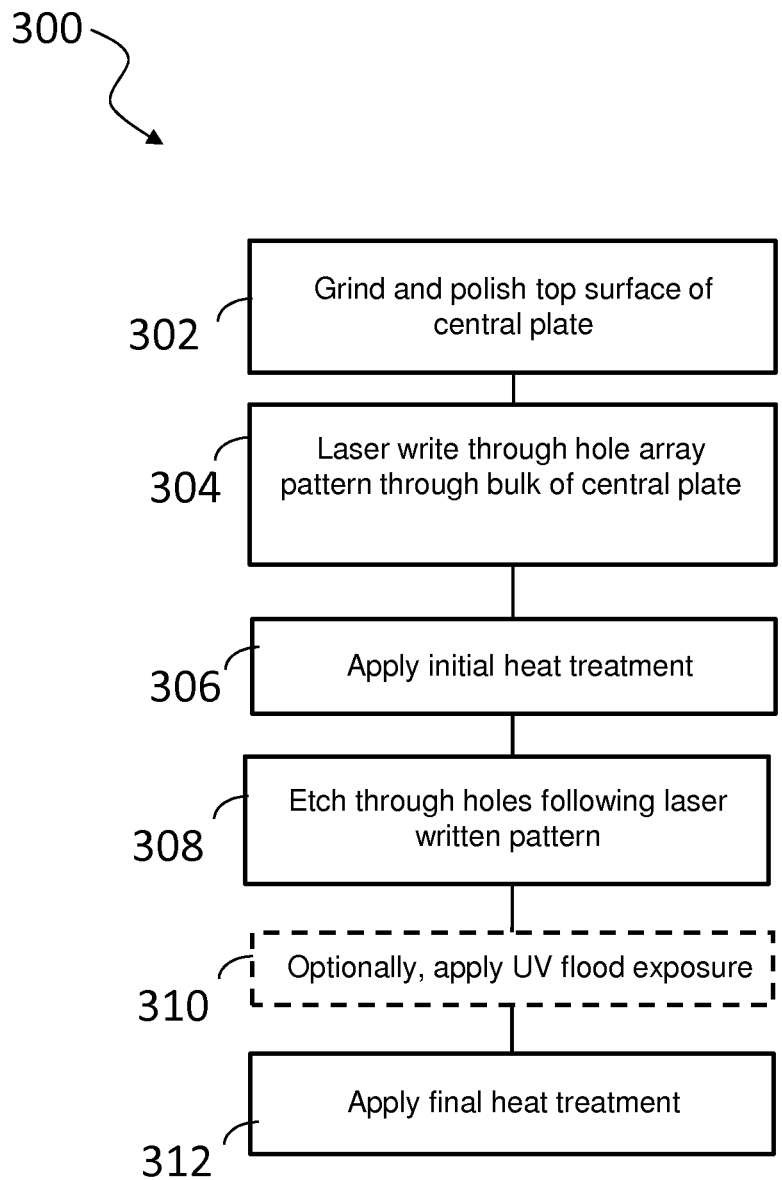
FIG. 3 is a flowchart of process steps for creating an array of through holes according to one embodiment.

FIG. 3 is a flowchart of process steps for a method 300 of performing step 202, creating an array of through holes of axisymmetric (e.g. conical) cross section in central plate 104, according to one embodiment. Method 300 is applicable when central plate 104 comprises a photo-structurable glass. In step 302, the bottom surface of central plate 104 is ground and polished. In step 304, a pattern corresponding to the desired array of through holes is laser written into the bulk of the central plate 104. In step 306, plate 104 is subjected to an initial heat treatment in preparation for step 308, in which an etchant is applied to etch through holes into the plate according to the laser written pattern. Application of the etchant to plate 104 results in the etched through holes having a desired axisymmetric shape, typically tapering down from the top surface to the bottom surface. In optional step 310, UV flood exposure may be applied to plate 104. In step 312, plate 104 is subjected to another heat treatment that determines the smoothness of the side-walls of the through holes. In some embodiments, this step may convert the bulk of plate 104 to black ceramic. A typical value of smoothness after this second heat treatment step is 10 nm Ra.

In some embodiments, step 202, creating an array of through holes of axisymmetric cross section in central plate 104, is carried out on glass that is not a photo-structurable glass. In some of these cases, laser sculpturing may be used. In some cases, hot embossing may be used to create blind or through holes in the central plate. In some embodiments the central plate comprises one of a metal, an amorphic oxide material, or a crystalline oxide material.

Either one of bonding steps 206 or 214 or both may be carried out using room temperature laser bonding according to some embodiments.

Room temperature laser bonding will now be described, with reference to FIG. 4. In the case illustrated, concerning the bonding of top plate 118 to central plate 104 at bonding regions 120, many structural details have been omitted, and only one bonding region shown for simplicity. Laser 402 emits light in the IR, visible or UV portions of the spectrum. This light is directed through the thickness of top plate 118 onto a layer of absorbing material 404, either by direct positioning of laser 402 as shown for simplicity, or more typically via an optical system including elements such as mirrors, prisms and/or lenses. In some embodiments, light from a single laser 402 may be split into multiple beams to address multiple bonding regions simultaneously; in some embodiments, a scanning system may allow for sequential addressing of bonding regions. In all cases, absorption of the laser light by layer 404 results in localized heating. In the embodiment shown, the material of layer 404, which is chosen to have an affinity for diffusion into the material of the top plate and the central plate, is deposited on the top surface of central plate 104. In another embodiment, not shown, the absorption layer may be deposited on the bottom surface of top plate 118. The absorption layer 404 may be a metal, semiconductor or ceramic material. In alternative embodiments other materials having appropriate wavelength absorption and diffusion affinity characteristics may be employed. The thickness of the absorption layer may be as thin as 10 Å and as thick as desired to compensate for surface roughness. Layer thickness may also be relevant to the control of the laser bonding process when self-regulation, as discussed below, cannot be assumed. An example of a typical absorption layer would be 100 nm of Cr deposited on a surface smooth to 4 ÅRa.

Figure 4:
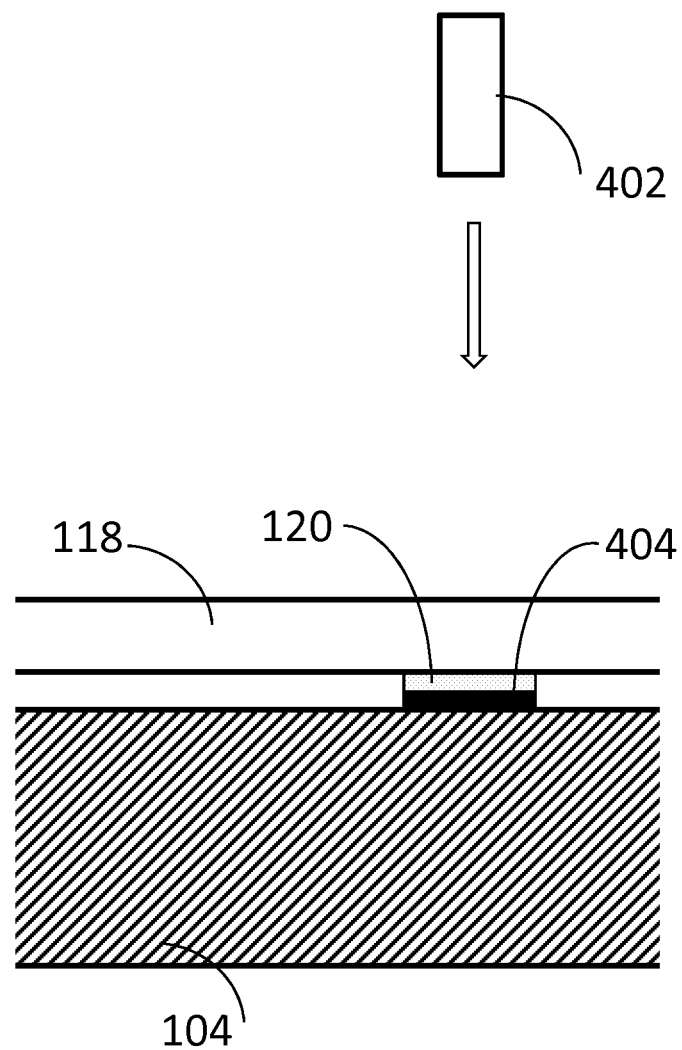
FIG. 4 is a schematic diagram illustrating how room temperature laser bonding may be employed according to one embodiment.

While FIG. 4 illustrates the arrangement in the case of bonding step 214, for attachment of the top plate to the already bonded central and base plate assembly, a similar arrangement could be used to achieve bonding step 206, for the attachment of the base plate to the central plate at bonding regions 108. In this case, absorbing layer 404 could be deposited on the top surface of base plate 110, and the laser light would be directed through the thickness of base plate 110. In some embodiments absorbing layer 404 could be deposited on the bottom surface of central plate 104.

Figure 5:
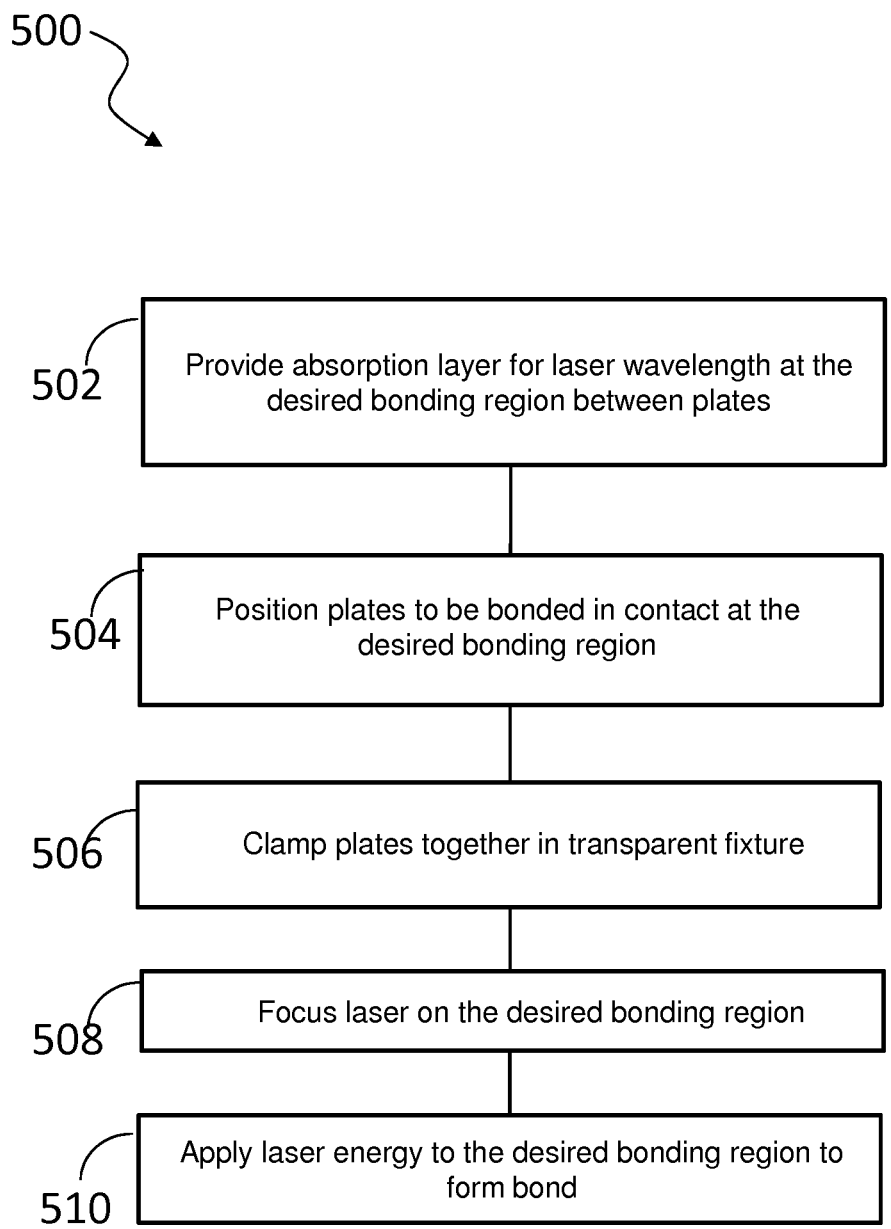
FIG. 5 is a flowchart showing process steps for room temperature laser bonding—one part of a process for fabricating a liquid lens array according to one embodiment.

FIG. 5 a flowchart of process steps for a method 500 that accomplishes bonding in some embodiments using room temperature laser bonding, with reference to the elements disclosed in FIGS. 1, 2 and 4. In step 502, a layer 404 that absorbs light at the laser wavelength is provided at the desired bonding region between the plates to be bonded. This layer may be deposited on the surface of either of the two plates in question. The absorption layer may be continuous over large regions of the top surface or patterned to limit the layer to the predetermined portions at which bonding is desired. Indeed, as will be described in detail below, the layer may be formed in the same process step that conductive traces 106 are formed.

In step 504, the plates to be bonded are positioned to be in contact at the desired bonding region. The surfaces may or may not be extremely well polished. The thickness of the absorption layer can be thickened to compensate for surface roughness. At step 506, the plates are clamped in a fixture that is transparent to the wavelength of laser energy being used. At step 508, the laser is roughly focused on the bonding region between the plates in the fixture. At step 510, the laser energy is applied to the bonding region. The energy may be incident through either of the plates, assuming the only absorbing material encountered is absorbing material 404 at the desired bonding region. Typically, this will mean incidence through the base plate, in the case of forming bonds at regions 108, or through the top plate in the case of forming bonds at regions 120.

The application of laser energy at step 510 has a series of effects. First, the temperature of the absorption layer 404 at the desired bonding location rises. Next, the surfaces of both plates soften in the areas in close proximity to that location. Those surfaces typically comprise layers of glass or an oxide or nitride. Then, the absorption layer, which has continued to absorb the laser energy, forms a plasma, and the temperature of the absorption layer is raised to a diffusion temperature. Next, the absorption layer diffuses into the softened materials of the plates above and below it and the bonding region becomes transparent to the laser energy, so absorption ceases and the plasma collapses. Finally, the softened materials of the plate surface fuse together into a permanent bond. It is important to note that the absorption layer should diffuse at a temperature that is higher than the first transition temperature of the glass of at least one plate to ensure that the glass becomes soft and bonds to the glass (or oxide or nitride) of the other plate. This approach makes the most robust, least particulate sensitive bond.

In this example, the entire process takes place such that almost the entire bulk of the two plates remains at room temperature and only the absorption layer and the plate materials situated immediately adjacent the region at which the laser energy is focused are elevated to a temperature where the absorption layer is diffused into the surrounding materials by absorbing the laser radiation. The width of a single bond-line can vary from approximately 0.001 µm to 100 µm or greater and the depth of the bond-line is nominally 500 nm into each component of the structure. However, it can vary from a fraction of a micro-meter to multiple micro-meters.

The room temperature laser bonding process takes advantage of the affinity of metals, ceramics and semiconductors to diffuse into glass at elevated temperatures making the bond-line virtually transparent both in the visible spectrum and to the laser radiation wavelength.

Therefore, in embodiments where the plate materials in the path of the laser are substantially transparent, the process is self-regulating. When the absorption layer has fully diffused into the surrounding materials, the laser energy passes through the plates with no further heating and the process stops. Therefore, no parts of the liquid lens array other than those at the desired bonding regions are ablated or overheated by the laser.

The transparency of the material through which the laser passes before reaching the bonding regions should be at least 70 percent at the wavelength at the laser energy. Otherwise, the reduced power penetration to the depth of the absorption layer may result in insufficient diffusion of the layer and thus an incomplete bond or no bond at all. Also, if too much laser radiation is absorbed prior to reaching that layer, the intervening material may be damaged.

Room temperature laser bonding lends itself to batch processing applications such as those of the current application, which is directed to fabricating arrays of liquid lenses in parallel rather than one at a time. As the process can be very fast, sequential multi-device bonding may be a practical option. In such embodiments, the laser energy is first applied to the bonding region for one device, and then, after either satisfactory bonding or abandonment of that device, is applied to the bonding region for another device, and so on. Typically, a scan pattern such as a raster scan may be followed. In other embodiments, the output beam from a single laser 402 may be split into multiple beams, each of which is directed to be applied to a different device at literally the same time across the entire plate. The split may be achieved employing beam splitters and a plurality of focusing optical trains.

Traditional bonding processes typically occur at elevated temperatures, where differences in thermal coefficients of expansion (TCE) may generate severe structural distortion and even device failure when the bonded assembly cools down. However, with the room temperature laser bonding process disclosed herein, only a highly localized temperature change occurs, so the bulk temperature of the materials being bonded can be maintained at the temperature at which the device is to be used, rather than being raised to hundreds of degrees above that level. The disclosed laser bonding therefore allows the bonding of materials of significantly different TCE while avoiding the risks of subsequent structural distortion and device failure.

An additional advantage of the room-temperature laser bonding process described herein is the ability to form conductive traces into the same interface layer that is being bonded. The structure of the traces may be formed by the laser track on the workpiece at the time of bonding. With respect to FIGS. 1 and 2, this means that step 204 of method 200 could not only create conductive traces 106 but also provide the absorbing layer 404 needed to achieve bonding in step 206 and/or step 214. Therefore, with laser bonding, it is not necessary to pattern the conductive layer to create a contact lead structure, which provides the additional "green" advantage of avoiding the photoresist deposition and etching processes required by conventional methods of lead or trace formation.

Tests have shown that bonds made using room temperature laser bonding provide hermeticity up to $2.10^{-12}$ Atm-cc/s, and have greater strength under shear stress than the materials of the plates themselves.

While the advantages of room temperature laser bonding discussed above make it a highly desirable choice, other bonding methods may be used in some embodiments to achieve either one of bonding steps 206 and 214. These methods may, for example, use epoxies, other adhesives, or glass frits to achieve a seal. In some of these embodiments, the conductive traces that make up the contact lead structure (by which applied voltages control the lenses) are formed in through hole vias to emerge from either top or bottom surfaces of the bonded structure as desired.

Figure 6:
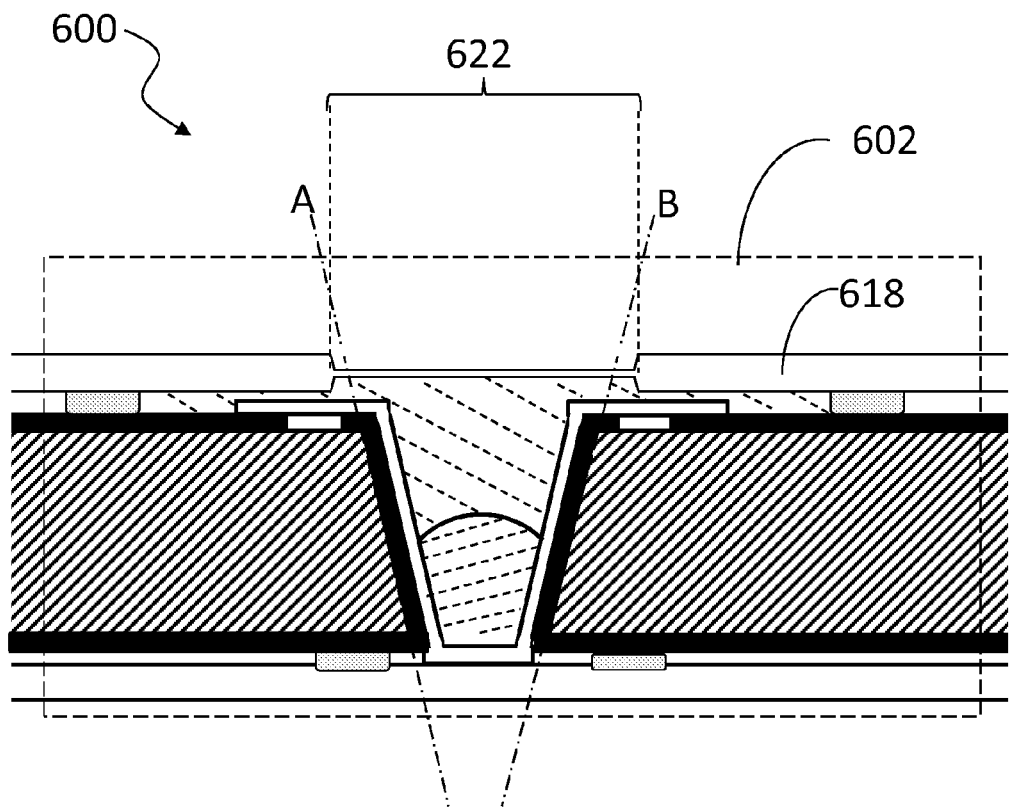
FIG. 6 is a schematic cross-sectional view of part of a liquid lens array in which the transparent top plate is structured to have a reduced thickness in particular regions according to one embodiment.

FIG. 6 is a schematic cross-sectional view of one liquid lens 602 of a liquid lens array 600 according to one embodiment in which the transparent top plate 618 is structured to have a reduced thickness in each region 622 directly overlying a corresponding through hole. The thickness may be reduced symmetrically from both top and bottom surfaces of top plate 618 as shown, or asymmetrically, with the reduction taking place entirely from one surface, leaving the opposite surface planar. An intermediate asymmetric reduction in thickness may be used in some embodiments. The thickness reduction may be achieved by etching or other means. In some embodiments, not shown, the base plate may be similarly structured to also, or instead, have a reduced thickness in corresponding regions. In some embodiments, the initial thickness of the top (or base) plate is 100 µm and the thinned region, which may be termed a membrane, is 50 µm thick. The width of the thinned region 622 may be slightly greater than the width of the through hole, as shown in FIG. 6, or equal to or slightly smaller than the width of the through hole.

Figure 7:
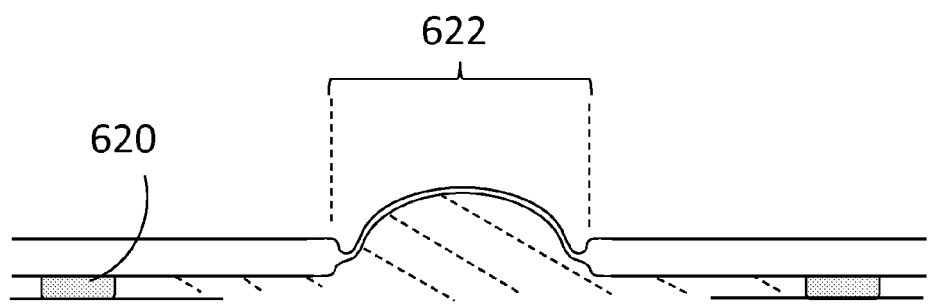
FIG. 7 is a zoomed in view of part of a liquid lens of FIG. 6, shown at an elevated temperature.

FIG. 7 is a zoomed in view, schematically showing how the thinned region 622 may bulge outwards when the temperature of the liquid lens is raised, either in pre-shipment testing or in subsequent storage, transport, or device operation. The ability of the thinned region to deflect outwards in response to increasing temperature, as shown, and in the opposite direction when the temperature falls, is a significant advantage provided by these embodiments. It allows thermal expansion and contraction to be accommodated without imposing stress on bonding region 620 or on other potential sites of structural failure in the fabricated device.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A liquid lens array comprising:
a bonded stack of top, central, and bottom plates;
wherein the central plate comprises a solid dielectric material surrounding an array of through holes of axisymmetric cross section, each of the through holes being bounded by walls comprising conductive traces and an insulating layer, and each of the through holes containing a polar liquid and a non-polar liquid.

2. The array of claim 1 wherein the central plate, the base plate, and the top plate comprise glass.

3. The array of claim 1 wherein the central plate comprises a photo-structurable glass.

4. The array of claim 1 wherein a surface of at least one of the top and bottom plates comprises an anti-reflection coating.

5. The array of claim 1 wherein at least one of the top plate and the base plate comprises glass comprising an array of regions of reduced thickness relative to surrounding regions, each region of reduced thickness directly overlying or underlying a corresponding liquid-containing through hole.

6. The array of claim 1 wherein, for each through hole, a portion of the base plate directly underlying the through hole is transparent at the wavelength of intended operation of the liquid lens array and a portion of the top plate directly overlying the through hole is transparent at the wavelength of intended operation of the liquid lens array.

7. The array of claim 1 wherein the insulating material comprises a non-conductive polymer.

8. The method of claim 7 wherein the non-conductive polymer comprises Parylene™.

9. The array of claim 1 wherein for each through hole, a single one of the conductive traces on the walls of the corresponding through hole forms a single electrode covering the walls of the corresponding through hole and extending to cover portions of the top surface of the central plate surrounding the corresponding through hole.

10. The array of claim 1 wherein for each through hole, the conductive traces on the walls of the corresponding through hole form at least three independently addressable electrodes.

11. The array of claim 1 wherein the bulk of the central plate comprises a black ceramic.

12. The array of claim 1 wherein each of the bonds of the bonded stack has a hermeticity greater than $10^{-12}$ Atm-cc/s.

13. The array of claim 1 wherein the central plate further comprises a plurality of through hole vias accommodating portions of the conductive traces.

* * * * *